(12) United States Patent
Beardsley et al.

(10) Patent No.: US 6,240,467 B1
(45) Date of Patent: May 29, 2001

(54) INPUT/OUTPUT OPERATION REQUEST HANDLING IN A MULTI-HOST SYSTEM

(75) Inventors: Brent Cameron Beardsley, Tucson, AZ (US); Joseph Charles Elliott, Hopewell Junction, NY (US); James Lincoln Iskiyan, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/167,860

(22) Filed: Oct. 7, 1998

(51) Int. Cl.[7] ................................................. G06F 13/14
(52) U.S. Cl. ................................. 710/5; 710/3; 709/200
(58) Field of Search ................................. 710/3–5, 7–9, 710/20–21; 711/112, 200; 709/107, 200

(56) References Cited

U.S. PATENT DOCUMENTS

| 4,958,243 | * | 9/1990 | Anderson et al. | 364/200 |
|---|---|---|---|---|
| 5,008,808 | * | 4/1991 | Fries et al. | 364/200 |
| 5,062,038 | * | 10/1991 | Jordan, Jr. | 364/200 |
| 5,185,870 | * | 2/1993 | Lenoski | 712/226 |
| 5,493,724 | * | 2/1996 | Cohn et al. | 710/38 |
| 5,584,039 | * | 12/1996 | Johnson et al. | 710/6 |
| 5,701,429 | * | 12/1997 | Legvold et al. | 711/114 |
| 5,787,463 | * | 7/1998 | Gajjar | 711/114 |
| 5,894,560 | * | 4/1999 | Carmichael et al. | 710/25 |
| 5,987,535 | * | 11/1999 | Knodt et al. | 710/15 |

* cited by examiner

Primary Examiner—Thomas Lee
Assistant Examiner—Thuan Du
(74) Attorney, Agent, or Firm—David W. Victor; Konrad Raynes & Victor (57) ABSTRACT

Disclosed is a system for handling an input/output (I/O) operation. A controller, such as a storage controller, receives an I/O operation against an address for an I/O device, such as a volume in a storage system. The controller determines whether there is at least one active I/O operation executing against the I/O device. After determining that there is at least one active I/O operation, the controller determines whether the received I/O operation conflicts with active I/O operations executing against the I/O device. The controller then executes the received I/O operation against the I/O device concurrently with the active I/O operations after determining that the received I/O operation does not conflict with active I/O operations.

24 Claims, 7 Drawing Sheets

| Channel Subsystem 20 | | | | | | | | | |
|---|---|---|---|---|---|---|---|---|---|
| Subchannel | 0 | 1 | 2 | 3 | ...7... | ...16... | ...22... | ...99... | |
| Unit Address (UA) | | | | | 14 | 25 | 333 | 12 | |
| Device No. | | | | | FFF0 | FF26 | 0053 | 0414 | |
| SCHIB | | | | | | | | | |

INPUT/OUTPUT OPERATION REQUEST HANDLING IN A MULTI-HOST SYSTEM

CROSS-REFERENCE TO RELATED APPLICATIONS

This application is related to the following and commonly-assigned patent applications, all of which are filed on the same date herewith, and all of which are incorporated herein by reference in their entirety:

"System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfiiend, U.S. application Ser. No. 09/168,017, now U.S. Pat. No. 6,170,023;

"Method And System For Dynamically Assigning Addresses To An Input/Output Device," by Brent C. Beardsley, Allan S. Merritt, Michael A. Paulsen, and Harry M. Yudenfriend, U.S. application Ser. No. 09/167,782, still pending; and "Method and System for Reassigning Addresses To An Input/Output Device," by Brent C. Beardsley, Allan S. Merritt, Michael A. Paulsen, and Harry M. Yudenfriend, U.S. application Ser. No. 09/167,603, now U.S. Pat. No. 6,167,459.

BACKGROUND OF THE INVENTION

1. Field of the Invention

The present invention relates to a method and system for handling concurrent Input/Output (I/O) operations to a single I/O device, such as a volume, and, in particular, preventing conflicting I/O operations from executing against the same I/O device.

2. Description of the Related Art

Figure 1:
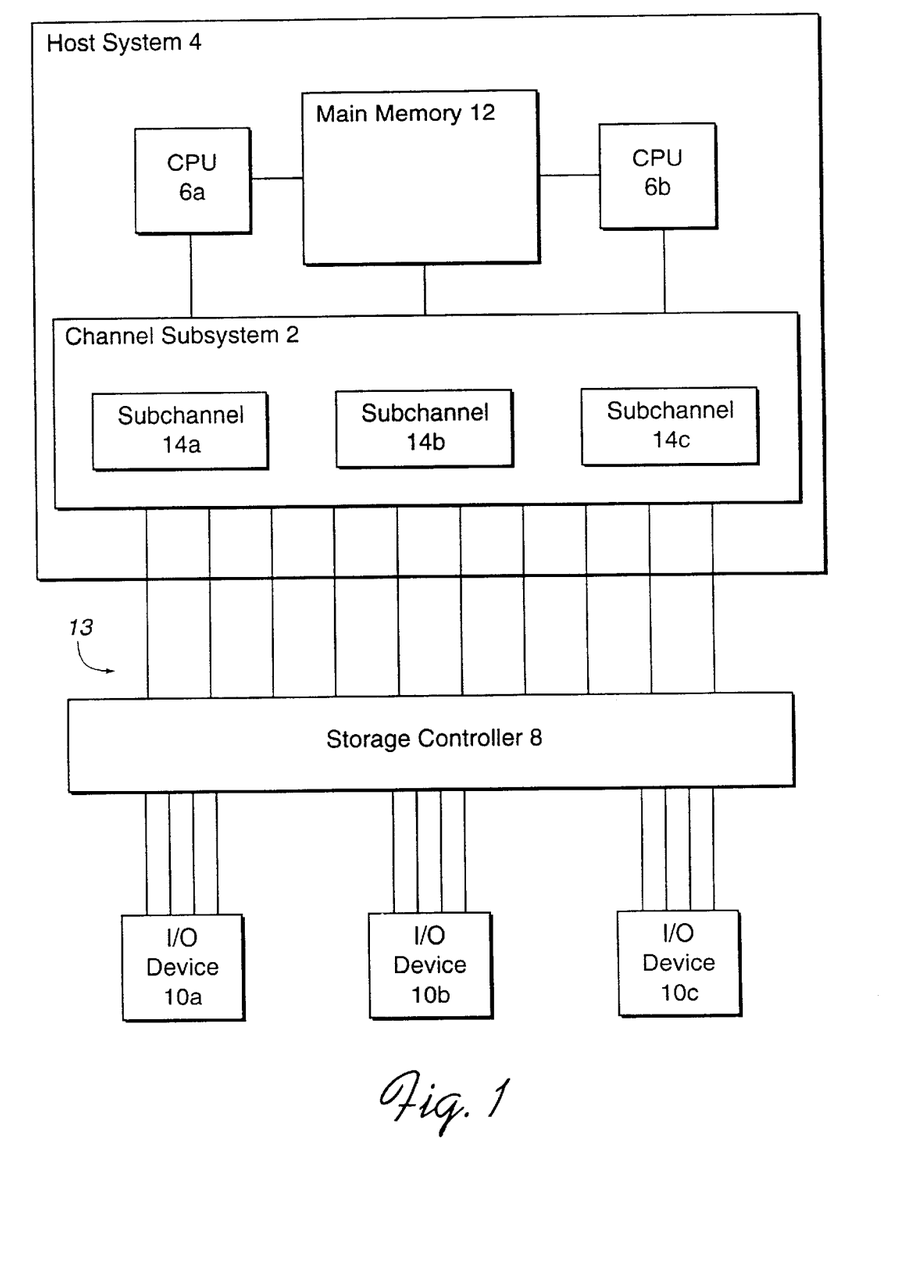
FIG. 1 illustrates a prior art system for handling I/O operations.

FIG. 1 illustrates a hardware environment of a channel subsystem 2 included in a host system 4 providing communication between CPUs 6a, b and I/O devices 10a, b, c. A storage controller 8 controls access to the I/O devices 10a, b, c. The host system 4 communicates with the storage controller 8 via the channel subsystem 2 and subchannels 14a, b, c therein. The host system 4 includes CPUs 6a, b that contain the sequencing and processing facilities for instruction execution, interruption action, timing functions, initial program loading, and other machine-related functions. The CPUs 6a, b may be host systems. The I/O devices 10a, b, c may be comprised of printers, magnetic-tape units, direct-access-storage devices (DASDs), displays, keyboards, communications controllers, teleprocessing devices, and sensor-based equipment. The storage controller 8 regulates and controls data transfers to the I/O devices 10a, b, c. The storage controller 8 function may be a separate stand alone machine, such as the IBM 3990 Storage Controller, or housed within the I/O device 10a, b, c or within the host system 4. In certain systems, the host system 4 may view the storage controller 8 as a multitude of separate control unit images or logical subsystems (LSSs), wherein each control unit image (LSS) provides access to one or more I/O devices 10a, b, c. The storage controller 8 may include multiple control unit images, i.e., LSSs, each of which may address up to 256 I/O devices.

The CPUs 6a, b and the channel subsystem 2 may access a main storage 12. Programs and data maintained in the I/O devices 10a, b, c such as storage drives, must be loaded into the main storage 12 before the CPUs 6a, b can process such programs and data. The main storage 12 may include a fast access buffer or cache. I/O operations involve the transfer of data between the main storage 12 and the I/O devices 10a, b, c. The channel subsystem 2 directs the flow of data between the storage controller 8 and the main storage 12. The channel subsystem 2 relieves the CPUs 6a, b of handling I/O operations and permits the CPUs 6a, b to devote processing cycles to other operations while the channel subsystem 2 concurrently handles data transfers. In typical implementations, the CPUs 6a, b, the main storage 12, and the channel subsystem 2 are all located within a single host 4 that is attached to a single storage controller 8, such as the IBM 3990 Storage Controller.

Channel paths 13 provide data communication between the channel subsystem and the storage controller 8. The channel paths 13 may employ a parallel-transmission protocol or a serial-transmission protocol. The storage controller 8 includes control logic to physically access the I/O devices 10a, b, c and control data transfer. In preferred embodiments, multiple channel paths 12 may be dedicated for communication with a particular I/O device 10a, b, c.

A subchannel 14a, b, c is dedicated to each I/O device 10a, b, c accessible to the channel subsystem 2, i.e., there is a one-to-one relationship between subchannels 14a, b, c and I/O devices 10a, b, c. Each subchannel 14a, b, c consists of internal storage and includes information relating the I/O devices 10a, b, c to the channel subsystem 2. The channel subsystem 2 uses the information in the subchannels 14a, b, c to access the I/O devices 10a, b, c. The subchannels 14a, b, c are assigned to the I/O devices 10a, b, c at initialization. The subchannels 14a, b, c maintain information such as the channel command word (CCW), channel-path identifier, device number, etc., concerning operations initiated with respect to the I/O device 10a, b, c represented by the subchannel 14a, b, c. I/O devices 10a, b, c that are attached to the channel subsystem 2 by multiple channel paths 13 may be accessed using any of the available channel paths 13. An I/O device 10a, b, c is addressed by channel-path identifiers (CHPIDs) identifying the path to a device, subchannel numbers identifying the subchannel 14a, b, c associated with the device, and a device number uniquely identifying the I/O device 10a, b, c to the host system 4. The IBM S/390 operating system allows for dynamic-reconnection, wherein the storage controller 8 may select any channel path 13 leading to the host system 4 when logically reconnecting to the channel subsystem 2.

The main storage 12 includes unit control blocks (UCBs) which include information on the subchannels and I/O devices. The CPUs 6a, b may access the UCB information when initiating I/O operations.

The channel subsystem 2 may receive numerous I/O operations from CPUs 6a, b directed toward the I/O devices 10a, b, c. The channel subsystem 2 initiates a channel program which comprises a series of channel commands to access and perform the I/O operation requested by the host system 4. An I/O operation toward a volume operates through the execution of a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory 12, and chain command information specifying whether commands are chained together. With each chain of commands, a define extent command may be provided indicating the permissible I/O operations that may be performed and a locate record command indicating the actual I/O operation to be performed. The chain of CCW commands may operate within the defined extent range. A description of these commands is provided in the IBM publication, "IBM 399019390 Storage Control Reference," IBM Document no. GA32-0274-04 (Copyright IBM, 1994, 1996), which publication is incorporated herein by reference in its entirety.

A subchannel 14a, b, c establishes an active allegiance for a channel path when active communication is initiated with the I/O device 10a, b, c on the channel path. In current systems, the subchannel 14a, b, c can have an active allegiance to only one channel path at a time. While a subchannel 14a, b, c has an active allegiance on a channel path 12 to an I/O device 10a, b, c, the channel subsystem 2 does not actively communicate with that device on any other channel path. Thus, there is only one path of communication, and hence one channel program, directed toward an I/O device 10a, b, c at a given time even though there may be multiple dynamic channel paths 13 leading to the I/O device 10a, b, c. Although dynamic channel pathing provides multiple paths from the channel subsystem 2 to the storage controller 8, only one of the dynamic paths is used at a time to communicate with the I/O device 10a, b, c. The dynamic paths are used to provide an alternative path for reconnecting the storage controller 8 and the I/O device 10a, b, c to the host system 4. In preferred embodiments, the storage controller 8 selects the path for reconnection. In the prior art, execution of a channel program for a single host system along multiple paths would likely create device-busy conditions detectable by the channel subsystem and cause unpredictable results.

Thus, with prior art servers employing the channel subsystem architecture of the IBM ESA/390 server and other similar server systems known in the art, a single host system, e.g., CPUs 6a, b, cannot direct concurrent, multiple I/O operations toward the same volume, i.e., I/O device. In the current art, for a single host to execute multiple channel programs toward the same I/O device 6a, b, the host must queue and execute serially the channel programs as a single host cannot execute multiple channel programs toward the same I/O device 6a, b. Otherwise, if the multiple I/O tasks return data from the same device to a single host, the host could not relate the data to the completed I/O task because the host cannot distinguish on the basis of the address of the target I/O device 6a, b.

In prior art systems, the host channel subsystem 2 establishes allegiance between the subchannels 12a, b and channel paths to the control units 8a, b, c. In prior art host systems, only one I/O request at a time can have allegiance to a particular I/O device 26a, b. Another I/O request in the host can only gain allegiance after the previous I/O request executing commands in the subchannel 12a, b has released its allegiance. Prior art systems are described in the IBM publications "ESA/390 Principles of Operation," IBM document no. SA22-7201-04 (IBM Copyright 1990, 1991, 1993, 1994, 1996, 1997), and U.S. Pat. Nos. 5,197,069 and 5,530,897, assigned to IBM, which publications and patents are incorporated herein by reference in their entirety.

BRIEF DESCRIPTION OF THE FIGURES

Referring now to the drawings in which like reference numbers represent corresponding parts throughout.

SUMMARY OF THE PREFERRED EMBODIMENTS

To overcome the limitations in the prior art described above, the present invention discloses a system for handling an input/output (I/O) operation. A controller receives an I/O operation against an address for an I/O device. The controller determines whether there is at least one active I/O operation executing against the I/O device. After determining that there is at least one active I/O operation, the controller determines whether the received I/O operation conflicts with active I/O operations executing against the I/O device. The controller then executes the received I/O operation against the I/O device concurrently with the active I/O operations after determining that the received I/O operation does not conflict with active I/O operations.

In further embodiments, the received I/O operation address is an alias address addressing an I/O device addressed by a base address. In such case, the controller determines the base address from the alias address. This determined base address is then utilized to determine active I/O operations and execute the received I/O operation.

In still further embodiments, the storage controller may queue the received I/O operation in a queue after determining that the received I/O operation conflicts with an active I/O operation.

Preferred embodiments thus provide a method and system for a controller to handle I/O requests directed toward the same I/O device or volume in a manner that prevents conflicting parallel I/O operations from being executed against the same volume. For instance, preferred embodiments prevent two I/O operations proceeding against a volume or extent of data sets within the volume when one of the I/O operations is a write operation. This would prevent two writes to the same data set or a write to a data set that is currently the subject of a read or write operation.

The preferred embodiment conflict resolution technique can be applied to situations where multiple hosts execute multiple I/O operations against the same volume using the same address or where a single host executes multiple I/O operations against the same volume using base and alias addresses in accordance with the preferred embodiments.

DETAILED DESCRIPTION OF THE PREFERRED EMBODIMENTS

In the following description, reference is made to the accompanying drawings which form a part hereof, and in which is shown, by way of illustration, several embodiments of the present invention. It is understood that other embodiments may be utilized and structural changes may be made without departing from the scope of the present invention.

Hardware and Software Environment

Figure 2:
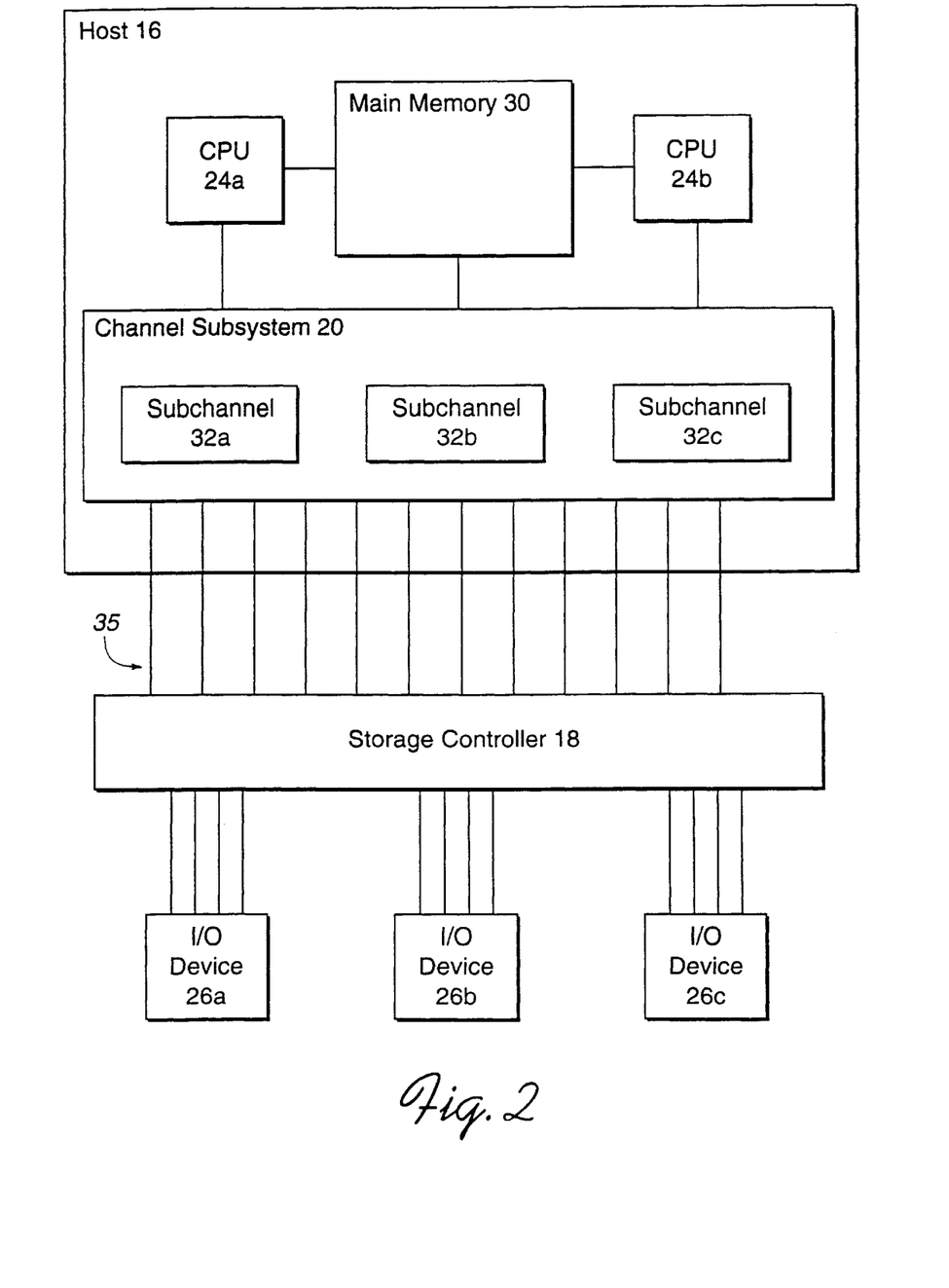
FIG. 2 illustrates a preferred hardware and software structure in which preferred embodiments of the present invention are implemented.

FIG. 2 illustrates a preferred hardware and software environment in which referred embodiments are implemented. A host system 16 is in communication with storage controller 18. The host system 16 views the storage controller 18 as a channel subsystem 20 that interfaces the CPUs 24a, b in the host 16 with I/O devices 26a, b, c. The host may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. As discussed, the storage controller 18 may include multiple logical subsystems (LSSs), i.e., control unit images, wherein each LSS may address up to 256 devices. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18.

The host 16 maintains unit control blocks (UCB) that include device (volume) identification information and a device number. A device number relates a unit control block (UCB) to a single subchannel 32a, b, c. The host 16 processes the UCB to determine the subchannel 32a, b, c for the I/O device 26a, b, c associated with the UCB. During initialization, each I/O device 26a, b, c is associated with a subchannel 32a, b, c. The host 16 processes the information in the subchannel 32a, b, c to address an I/O operation to an I/O device 26a, b, c. In particular, the host 16 initiates an I/O operation toward an I/O device 26a, b, c by initiating a channel program which consists of a series of I/O instructions, such as a chain of CCW commands, on the subchannel 32a, b, c.

Each subchannel 32a, b, c further maintains a unit address corresponding to the device number which identifies the I/O device 26a, b, c to the storage controller 18. Thus, the subchannels 32a, b, c maintain device number and unit address information for the I/O device 26a, b, c associated with the subchannel 32a, b, c. For each base and alias address, a unit address, device number, subchannel, and UCB comprise a means for the host 16 to communicate with the I/O device 26a, b, c (volume). The UCB may also maintain status information on the associated I/O device 26a, b, c. The subchannel 32a, b, c is used to transmit the I/O operation to the storage controller 18 using the unit address associated with the selected subchannel 32a, b, c.

The storage controller 18 maintains a different view of the system. The storage controller 18 is provided a base unit address for each I/O device 26a, b, c (volume) and one or more alias unit addresses for each base unit address. As discussed, for each logical subsystem (LSS) within the storage controller 18, the 256 addresses for a LSS may be allocated in any manner between base and alias addresses. After assigning a base address to each I/O device, the remaining addresses can be allocated as alias addresses to the base addresses in any arrangement. The storage controller 18 uses the unit addresses to physically access the I/O devices 26a, b, c (volumes). In preferred embodiments, the structure of the storage controller 18 and interface between the storage controller 18 and host system 16 may be the storage controller 18 structure described in the following U.S. patent applications assigned to IBM: "Failover System for a Multiprocessor Storage Controller," to Brent C. Beardsley, Matt Kalos, Ronald R. Knowlden, Ser. No. 09/026,622, now U.S. Pat. No. 6,061,750, filed on Feb. 20, 1998; and "Failover and Failback System for a Direct Access Storage Device," to Brent C. Beardsley and Michael T. Benhase, Ser. No. 08/988,887, now U.S. Pat. No. 6,006, 342, filed on Dec. 11, 1997, both of which applications are incorporated herein by reference in their entirety.

Base And Alias Addresses

Figure 3:
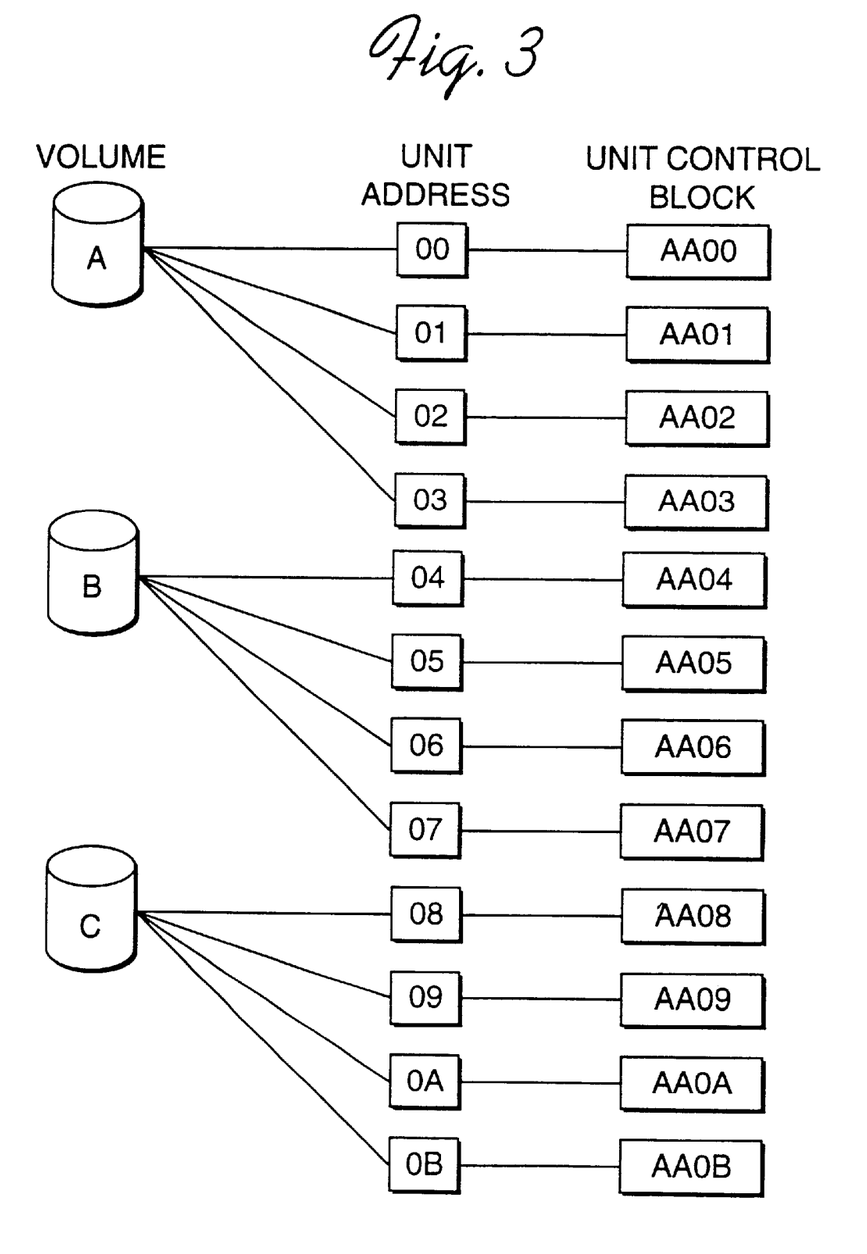
FIG. 3 illustrates how multiple addresses can relate to a single volume in accordance with preferred embodiments of the present invention.

FIG. 3 illustrates how a base and multiple alias addresses address an I/O device 26a, b, c in accordance with preferred embodiments of the present invention. In FIG. 3, the I/O device 26a, b is a volume in a storage device, such as a direct access storage device (DASD). For each base and alias address, there is a corresponding UCB and unit address. One of the unit addresses and UCBs is for the base address and the other three are the alias addresses. Each unit address and UCB corresponds to a single subchannel 32a, b, c which further relates to a plurality of channel paths 35 that link the channel subsystem 20 to the storage controller 18. A volume may be addressed with either the base or alias addresses associated with the volume. For instance, with reference to FIG. 3, volume A may be addressed using base unit address 00 and base UCB AA00, and alias unit addresses 01, 02, 03 and alias UCBs AA01, AA02, AA03. The main memory 30 includes a UCB for each alias address and base address assigned to a volume. The host 16, i.e., CPUs 24a, b, accesses the UCBs to determine the status of the I/O devices 26a, b, c. The UCBs in turn provide the subchannel 32a, b, c information, which further provides the unit address information needed for the I/O operation.

In preferred embodiments, every channel path 35 from the channel subsystem provides a unique path to a volume (I/O device). An I/O operation or chain of CCW commands can be simultaneously executed toward the same volume using the different base and alias unit addresses for the volume. In this way, the executed CCW commands are all directed toward the same I/O device 26a, b, c using different addresses, wherein each address uses one of multiple channel paths 35 to reach a single volume or I/O device 26a, b, c. This allows a single host 16 to concurrently execute multiple I/O operations against a single volume. As discussed, alias addresses can be selectively allocated to base addresses that address particular I/O devices 26a, b, c as desired. The number of aliases provided for a base should be set according to the size of the volume and the number of concurrent users. In certain cases, only a few aliases may be needed to accommodate network traffic for a particular base address for an I/O device 26a, b, c.

The host 16 first attempts to access a volume (I/O device 26a, b, c) through the base UCB for the I/O device 26a, b, c. If the base UCB is unavailable, i.e., concurrently servicing another I/O operation, then the host 16 may use one of the available alias UCBs to concurrently access the I/O device 26a, b, c. The host system 16 then performs the I/O operations through the subchannel 32a, b, c associated with the UCB and the channel paths 35 provided for the subchannel 32a, b, c. When data is returned to the host system 16, the host system 16 can determine the I/O device 26a, b, c from which the return data came from the address. Thus, if multiple I/O operations are directed toward a single I/O device 26a, b, c concurrently along different subchannels using different UCBs, the host system 24a, b can handle multiple returns from the I/O operations because there are multiple UCBs associated with an I/O device 26a, b, c and, hence, multiple ways to associate the host 16 with an I/O device 26a, b, c. The host 16 may use multiple addresses to access the same volume as long as each channel program executed against one of the base or alias addresses does not try to update data used by another channel program accessing the same device.

Figure 4:
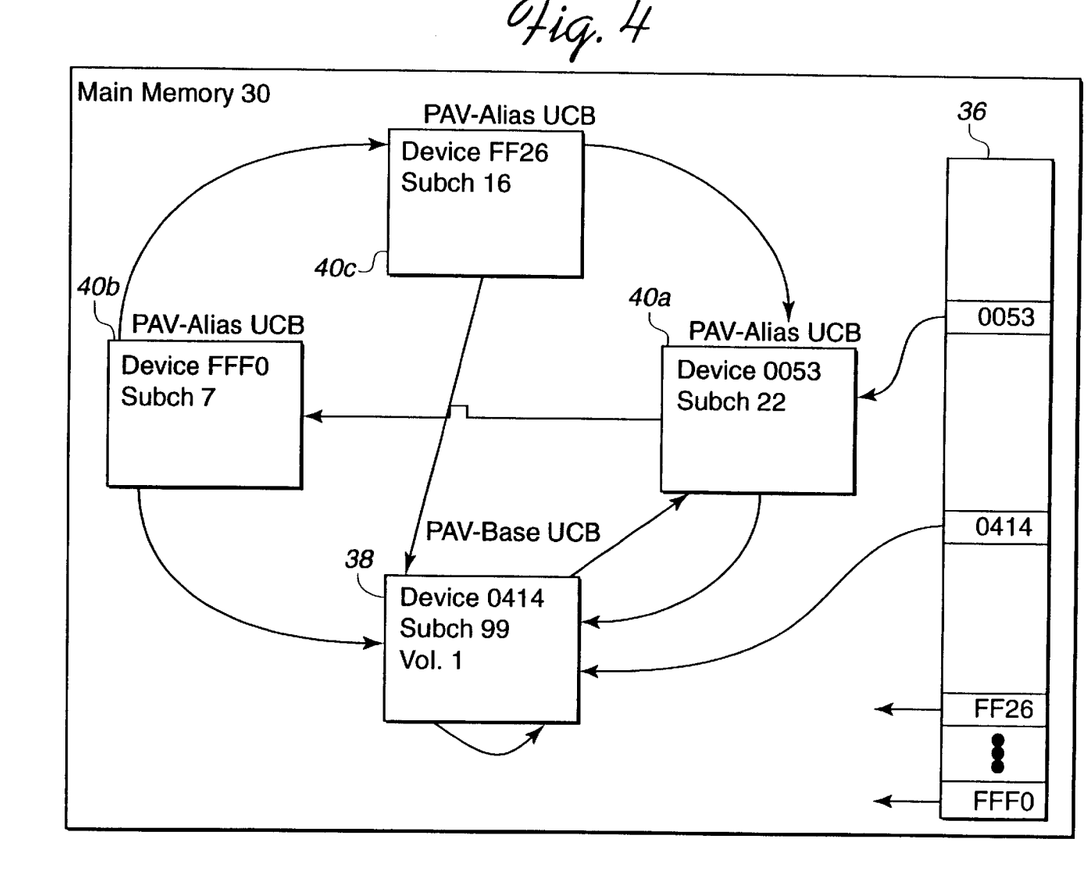
FIG. 4 illustrates a data structure indicating base and alias addresses in accordance with preferred embodiments of the present invention.

FIG. 4 illustrates the relationship of a universal look-up table (ULUT) 36 containing the device numbers which relate to base and alias UCBs. In preferred embodiments, the ULUT 36 and UCB data structures 38, 40a, b, c are maintained in the main memory 30 of the host 16. The base 38 and alias UCBs 40a, b, c bound to the base 38 include pointers to address each other. A bound alias UCB indicates that during configuration, the host 16 formally associated, i.e., bound, the alias UCB to a base UCB. If an alias UCB has not been associated with a particular base UCB, then that alias is unbound. Only bound alias UCBs can be used to address a particular I/O device 26a, b, c in lieu of the base UCB 38. In preferred embodiments, the ULUT 36 may also include fields indicating whether a particular UCB identified by the device number in the ULUT is bound or unbound and a base or alias.

The alias UCBs 40a, b, c form a circular chain, referred to herein as the parallel access volume (PAV) circular queue. For instance, device number 0414 references a base UCB 38 and device numbers 0053, FFF0, FF26, each reference an alias UCB 40a, b, c, respectively. The base UCB 38 addresses the first alias UCB bound to that base. Each of the alias UCBs 40a, b, c include a pointer addressing the next alias UCB in the chain and a pointer back to the base UCB 38 to which the alias UCB 40a, b, c is bound. The last bound alias 40c further includes a pointer addressing the first bound alias UCB 40a. The first bound alias UCB 40a includes a pointer to the next bound alias UCB 40b. In this way, the alias and base UCBs 38, 40a, b, c form a chain, i.e., circular queue, of linked UCBs. As shown in FIG. 4, each UCB 38, 40a, b, c includes the subchannel number of the corresponding subchannel that provides address information for the I/O device 26a, b, c (volume) associated with the UCB. In FIG. 4, the base UCB identifies the actual volume, Vol. 1, to which the base refers. U.S. Pat. No. 5,530,897, entitled "System for Dynamic Association of a Variable Number of Device Addresses With Input/Output Devices to Allow Increased Concurrent Requests for Access to the Input/Output Devices," assigned to IBM and which patent is incorporated herein by reference in its entirety, includes further description of the information maintained in the UCBs The base UCB 38 of a bound alias UCB, e.g., alias UCB 40b, can be identified from the ULUT 36 and the PAV circular queue. First, the ULUT 36 is used to locate the alias UCB 40b. Then the base UCB 38 may be identified from the pointer in the alias UCB 40b that addresses the base UCB 38. To obtain an address for an I/O operation, the host 16 would first attempt to use the base UCB 38 for the target volume. If the base UCB 38 is involved in an I/O operation or otherwise unavailable, then the pointer in the base UCB 38 to the first alias UCB 40a would be used to determine whether the first alias UCB 40a was available. If so, the first alias UCB 40a would be used to provide an address and subchannel for the I/O operation. Otherwise, the first available alias UCB in the PAV circular queue would be used to provide an address for addressing the volume.

Figure 5:
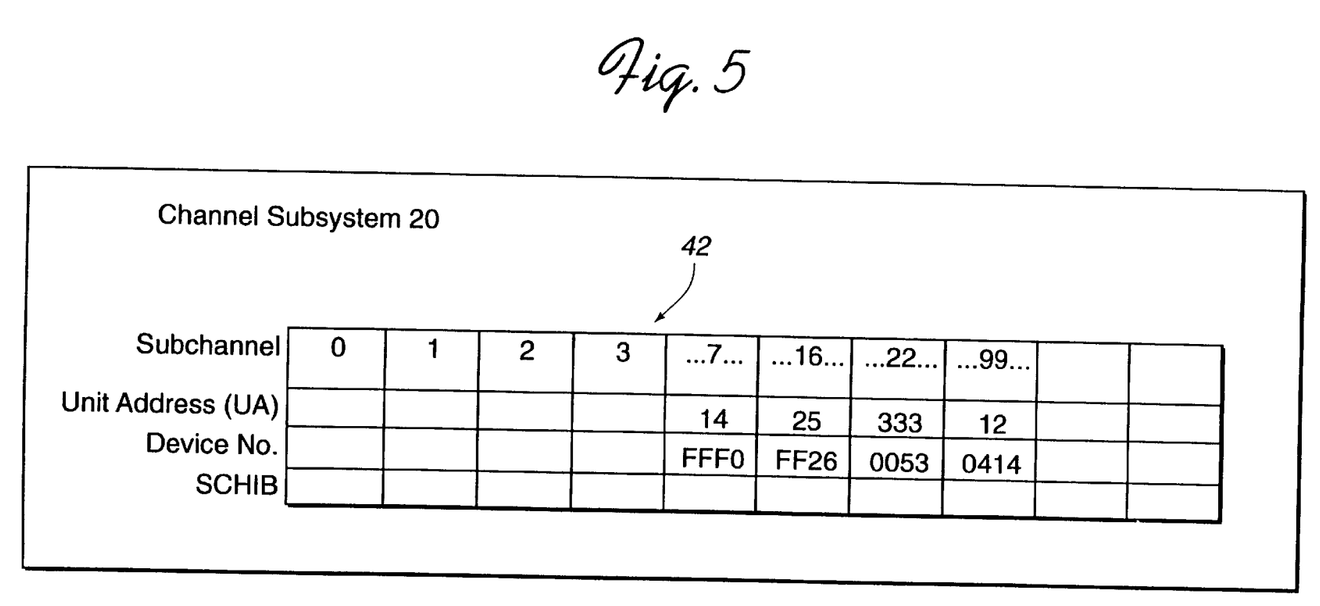
FIG. 5 illustrates a data structure indicating subchannel information in accordance with preferred embodiments of the present invention.

FIG. 5 illustrates a table 42 maintained in the channel subsystem 20 including information for each subchannel. Each subchannel 32a, b, c is identified by a unique 16 bit number starting from 0. Each subchannel 32a, b, c includes the device number assigned to the UCBs maintained in the ULUT 36 that correspond to the subchannel and a unit address identifying the I/O device 26a, b, c (volume) to the subchannel. As discussed, a subchannel 32a, b, c provides the logical appearance of a device to the host 16 and contains the information required for sustaining I/O operations against an I/O device 26a, b, c. Each subchannel 32a, b, c includes a subchannel information block (SCHIB) that includes the channel path identifiers (CHPIDS) of the channel paths 35 associated with the subchannel 32a, b, c. The CHPID is a system-unique eight-bit value assigned to each installed channel path 35 of the system through which the I/O devices 26a, b, c may be reached. Each CHPID 35 identifies a physical channel path. A subchannel 32a, b, c provides multiple channel paths, each identified by a CHPID, which the subchannel 32a, b, c may use to communicate with the I/O devices 26a, b, c. In this way, each subchannel 32a, b, is associated with one UCB through the device number and the unit address. Each subchannel 32a, b, c provides a mechanism to the host 16 for accessing and addressing the I/O device 26a, b, c over the channel paths 35 associated with the subchannel. In this way, multiple subchannels may be used to access the same volume by accessing multiple subchannels leading to the same volume.

For instance, upon selecting a base 38 or alias 40a, b, c address to use for an I/O operation, the host 16 would determine the corresponding channel subsystem 32a, b, c from the UCB of the selected base or alias address. Using the table in the channel subsystem 20 illustrated in FIG. 5, the host system 16 could then determine the unit address. For instance, if the host system 16 selected alias UCB 40b, the host 16 would process the alias UCB 40b to determine the subchannel 7 for the address. From the table in FIG. 5, the host 16 would determine the unit address 14 for subchannel 7.

When the host 16 executes an I/O operation on a subchannel 32a, b, c, the subchannel 32a, b, c provides the unit address of the target I/O device 26a, b, c. The channel subsystem 20, using the subchannel 32a, b, c information then transmits the I/O operation to the unit address associated with the subchannel 32a, b, c. The storage controller 18 then uses this unit address to execute the I/O operation.

Figure 6:
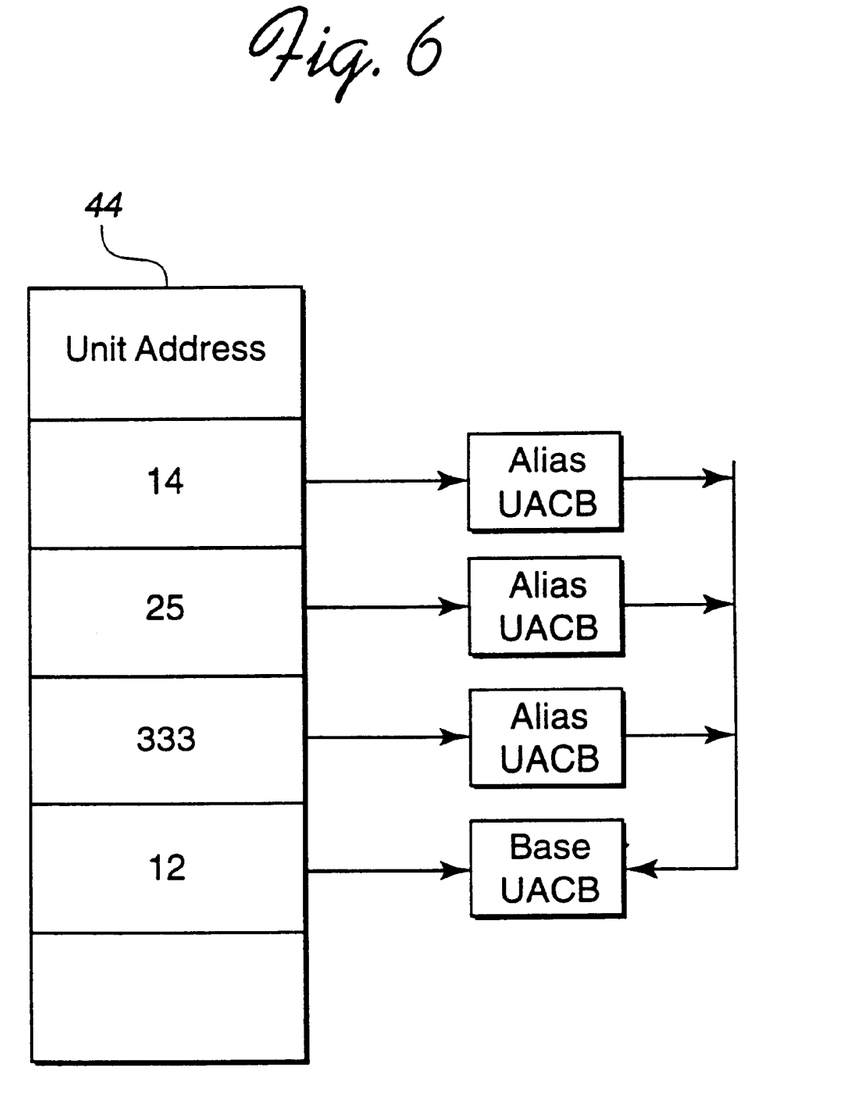
FIG. 6 illustrates a data structure indicating the relationship of unit addresses in accordance with preferred embodiments of the present invention.

The storage controller 18 maintains a control block for each unit address, otherwise referred to as a unit address control block (UACB). This UACB includes status information on the I/O device 26a, b, c the unit address addresses. FIG. 6 illustrates a table 44 of unit addresses 14, 25, 333, 12 which point to the corresponding UACB for the unit address. The UACB identifies itself as a base or alias. The alias UACBs include a pointer to the base UACB for that alias. The storage controller 18 can determine the base unit address from the alias unit address by looking up the alias unit address in the table 44, locating the alias UACB from the pointer, and then determining the base UACB from the pointer in the alias UACB. The storage controller 18 would process the base UACB to determine the base unit address for the alias unit address that is the target of the I/O operation.

The storage controller 8 executes a task or I/O operation comprised of a chain of CCW commands by allocating a task control block including control information for an I/O operation, e.g., chain of CCW commands, and queuing the task control block against a base UACB. In this way, a multitude of tasks represented by task control blocks can be queued against a single volume (I/O device 26a, b, c). The task control block includes information needed to execute the chain of commands, such as the unit address, base or alias, that is the target of the task, and any other control information needed to complete the task and return the data to the host system 4.

If the I/O operation is directed toward an alias unit address, the storage controller 18 processes the alias UACB to determine the base unit address from the pointer in the alias UACB to the base UACB. The storage controller 18 then queues the I/O operation, i.e., task control block, against the located base unit address identified in the base UACB. The storage controller 18 queues multiple I/Os against the same base address. If there are multiple paths to the I/O device 26a, b, c (volume) identified by the base unit address, then the storage controller 18 may execute multiple I/O operations in parallel on the multiple paths. Although the storage controller 18 executes the I/O operation against the base unit address, when an I/O operation requires an attention or return message, the storage controller 18 uses the initial alias unit address associated with the I/O operation when returning a message or data to the host system 16.

The host 16 may issue a reserve command to reserve an I/O device 26a, b to prevent other hosts from accessing the I/O device 26a, b, c (volume). The reserve command provides a host exclusive access to a volume. For instance, to allocate a data set, the host system 16 could issue a command to reserve the volume including the data set, read a volume table of contents (VTOC) to determine if the volume the host wants to reserve is available, update the VTOC, and release the volume. Once reserved, no other host can access the volume until the reserving host releases the volume by writing a release to the VTOC. Once reserved, only the reserving host can issue I/O against. When a volume is reserved, the storage controller 18 would reserve all base and alias unit addresses addressing the reserved I/O device 26a, b, c. In preferred embodiments, a host may only issue a reserve command against the base address. No other host can access the volume or I/O device 26a, b, c until the reserving host writes to the VTOC to indicate that the volume is available.

In preferred embodiments, the host 16 and storage controller 18 maintain separate views of the system. For instance, the storage controller 18 has no knowledge of the channel subsystem 20, subchannels 32a, b, UCBs, etc., which are part of the host 16 view.

Configuration Data Records

The host 16 obtains information on the arrangement of the PAV devices by issuing a Read Configuration Data (RCD) command to an I/O device 26a, b, c. In response, the storage controller 18 provides Configuration Data Records (CDR) indicating the addressing, status, and control information for the device. In preferred embodiments, there is one CDR per channel path to an I/O device 26a, b. A CDR includes a variable number of 32 byte fields called node-element descriptors (NED). A node element is any identifiable entity in the system, e.g., volume, RAID Rank, cluster, subsystem, etc. The NED contains data that uniquely describes the node element. The CDR further includes a token NED which identifies the CDRs associated with a logical subsystem (LSS). All the CDRs for a particular LSS, i.e., control unit image, have the same token NED. A storage cluster is a power and service region that runs channel commands and controls the storage devices. Each storage cluster contains both channel and device interfaces. Storage clusters also perform the DASD controller functions.

The main memory 30 includes a configuration data table (CDT) which is comprised of the CDRs for each subchannel 32a, b, c. The host 16 may access this table to access CDR records. Table 1 below shows a preferred embodiment of the fields included in the CDR data structure for an alias UCB in accordance with preferred embodiments of the present invention. The Node Element Qualifier (NEQ) describes the paths and addressees for a particular device, controller, volume, etc. A further description of the NED and NEQ fields are described in IBM document "Storage Subsystem Library: IBM 3990 Storage Control Reference (Models 1, 2, nd 3)", IBM document no. GA32-0099-06, (IBM Copyright 1988, 1994) and U.S. Pat. No 5,191,069, assigned to IBM, which publication and patent are incorporated wherein by reference in their entirety.

TABLE 1

| FIELD | DESCRIPTION |
|---|---|
| 1 | Node Element Descriptor (NED) of the Volume |
| 2 | Node Element Qualifier (NEQ) for the Volume NED. |
| 3 | NED 2, which describes the RAID rank information for the volume. |
| 4 | NED 3 contains the NED for the cluster that the system adaptor resides in. |
| 5 | NED 4 describes the physical subsystem |
| 6 | NEQ, that describes the paths and addresses |

Table 2 below describes fields included in the NEQ field in the CDR when the system supports PAV base and alias addresses in accordance with preferred embodiments of the present invention.

TABLE 2

| FIELD | DESCRIPTION |
|---|---|
| 1 | Flags |
| 2 | Unit Address Flags for the DASD, indicating whether unit address is base address or alias address |
| 3 | Alias Address Parameters. When the unit address is an Alias address, as indicated in Field 2, this field contains the base unit address to which the alias address is bound. |

The NEQ indicates the unit address associated with the device number and subchannel and whether the unit address associated with the CDR is a base or alias. When the unit address is an alias, the third field of the NEQ indicates the base unit address of the I/O device 26a, b, c associated with the alias. The CDT further maintains a subsystem control block (SSCB) which identifies the channel subsystem 20. All CDRs are grouped according to the SSCB. Each UCB addresses the SSCB containing the paths to the I/O device 26a, b, c represented by the UCB.

Table 3 below illustrates the CDR record generated for base addresses and single access volumes (SAVs) which do not have alias addressing capabilities.

TABLE 3

| FIELD | DESCRIPTION |
|---|---|
| 1 | Node Element Descriptor (NED) of the Volume |
| 2 | NED 2, which describes the RAID rank information for the volume. |
| 3 | NED 3 contains the NED for the cluster that the system adaptor resides in. |
| 4 | NED 4 contains the token NED for the subsystem. |
| 6 | NEQ, that describes the paths and addresses |

During initialization, the host 16 issues the RCD commands to obtain the CDR data from the storage controller 18 for each subchannel 32a, b, c. The host 16 futhers issues a set system characteristics command to the storage controller 18 to inform the storage controller 8 of the host 16 capabilities, including whether the host 16 supports PAV.

Initialization

In preferred embodiments, an operator may encode in the storage controller 18 the structure of the system, including the I/O devices 26a, b, c (volumes), logical subsystem (LSS) information, the base addresses, the alias addresses, the number of channel paths 35 between the storage controller 18 and the channel subsystem 20, the subchannels 32a, b, c, the device numbers, the unit addresses, etc. As discussed, the device number identifies a subchannel 32a, b, c and corresponding I/O device 26a, b, c to the host 16 and the unit address identifies the I/O device 26a, b, c to the storage controller 18. In preferred embodiments, the operator defines the base and alias addresses independently, i.e., the operator does not specify the relationship of aliases to bases. Thus, no binding of base and aliases is implied by the user defined parameters.

Thus, the storage controller 18 maintains the settings, including control units, device addresses, unit addresses, alias addresses, base addresses, channel paths etc. defined by the operator. In preferred embodiments, the storage controller 18 does not have to proceed through initialization to determine the alias and base configurations as does the host 16.

In a static assignment system, once the user defines the alias and base addresses at the storage controller 18, the alias and base addresses remain permanently assigned to specific I/O devices and the channel paths connecting thereto. In such static assignment systems, the relationship between the base and alias addresses is defined by the user for both the host system 16 and storage controller 18 levels. In alternative embodiments, the relationship between the base and alias addresses may be dynamic, which means that the user may dynamically reassign alias addresses to different base addresses.

With dynamic binding systems, during configuration, the host 16 will issue RCD commands to obtain the CDRs describing the I/O devices 26a, b, c and device numbers, unit addresses, and base and alias addresses maintained at the storage controller 18. For each base and alias address, the host 16 will generate UCBs from the CDRs received from the storage controller 18. The host 16 will then bind the alias to base UCBs based on the CDR information received from the storage controller 18. In this way, the host 16 maintains the binding of base and alias addresses for all I/O operations subsequent to the initialization. If an operator reassigns the alias and base addresses at the storage controller 18, then the host 16 would again issue RCD commands to obtain the CDR records describing the new alias and base relationship. The host 16 would then bind the alias and base addresses according to the new relationship indicated in the read CDR records. The binding sets a relationship between a particular UCB and a unit address for the host 16 view. In this way, the binding of alias and base addresses would be available for all subsequent I/O operations. Related IBM patent applications: "Method and System for Dynamically Assigning Addresses to an Input/Output Device," U.S. Ser. No. 09/167,782 still pending and "Method and System for Reassigning Addresses To An Input/Output Device," by Brent C. Beardsley, Allan S. Merritt, Michael A. Paulsen, and Harry M. Yudenfriend, U.S. Ser. No. 09/167,603 now U.S. Pat. No. 6,167,459, which applications were incorporated by reference in their entirety above, describe systems for dynamically assigning and reassigning alias addresses to base addresses.

At the time the host 16 initiates an I/O operation, a data path is formed consisting of one alias or base UCB, one subchannel, one channel, and one unit address. The host 16 would select a particular base or alias UCB to use for the I/O operation.

Those skilled in the art will appreciate that there are alternative methods for assigning base and alias addresses to particular I/O devices (volumes).

Control Information

In preferred embodiments, the host 16 transmits control information with an I/O operation. In the IBM ESA 390 system, such control information is in the form of a define extent and locate record commands. The define extent command indicates the permissible range of I/O operations; the locate record command indicates the actual I/O operation to be performed. Following the define extent and locate record commands is a series of CCW commands to execute the I/O operation defined by the define extent and locate record commands. The define extent command defines the extent in which the I/O operation for a subchannel 32a, b, i.e., channel program, operates. An extent is a set of consecutively addressed tracks that the I/O operation is permitted to access. The define extent command specifies the first and last addressable tracks in the extent. The define extent command further includes a field defining attributes and limitations on the associated I/O operation. The define extent command includes a mask byte which is used to inhibit certain write or other I/O operations that may be attempted against the permitted extent. For instance, the mask byte could permit or inhibit all write operations, certain write operations, update operations, seek commands, recalibrate commands, etc. The locate record command is used to specify the operations, number of consecutive tracks, and orientation state to establish before data transfer.

Thus, the define extent command indicates what the I/O operation is permitted to do, the locate record command indicates the actual I/O operation, and the following CCW commands cause the storage controller 18 to initiate the actual I/O operation as indicated in the locate record command. Before executing the I/O operation, the storage controller 18 would determine whether the I/O operation indicated in the locate record is consistent with operations the define extent command permits. Details of the define extent and locate record commands are described in the IBM publication "IBM 3990 Storage Controller Reference," IBM document no. GA32-0099-06, which publication was incorporated herein by reference above.

Multiple Allegiance

An I/O device 26a, b, c has allegiance to a channel path 35 when the channel subsystem 20 successfully selects an I/O device 26a, b, c. Multiple allegiance occurs when multiple I/O operations are executed against the same device. Multiple I/O operations can be executed concurrently against the same device independent of whether the host system is SAV and/or PAV capable. In fact, multiple hosts can execute multiple I/O operations against the same volume, either PAV or SAV, using the same address. For those volumes where there are no alias addresses, i.e., SAVs as opposed to PAVs, a single host cannot issue concurrent I/O operations against such SAV volume. However, in preferred embodiments, a host system 4 can execute multiple parallel I/O operations toward the same PAV volume using base as well as alias addresses.

Each host provides host identification information with the target address of the I/O operation. In this way, any returns or attention messages resulting from the I/O operation will be routed to the host as identified in the target address. For instance, a target address for an I/O operation may include a first part consisting of the host or CPU address and a second part comprising the unit address of the I/O device 26a, b, c. This host address/ID information distinguishes the I/O operation to the storage controller 18 and requesting device, i.e., host or CPU. Because different hosts or CPUs within a host are not aware of the I/O operations being executed by other hosts or CPUs, different hosts can execute multiple I/Os using the same base address to a SAV volume or base or alias address to a PAV volume. However, a data integrity issue may arise if two hosts are writing to the same track at the same time or if a host is reading from a data set to which another host is writing.

Preferred embodiments, utilize the define extent command to prevent inconsistent I/O requests toward the same data set independent of whether the I/O requests are from different hosts or the same host. As discussed, the define extent command indicates the extent range of tracks that the I/O operation may execute against. The mask byte information indicates whether the I/O operation included in the define extent command is allowed to write.

Figure 7:
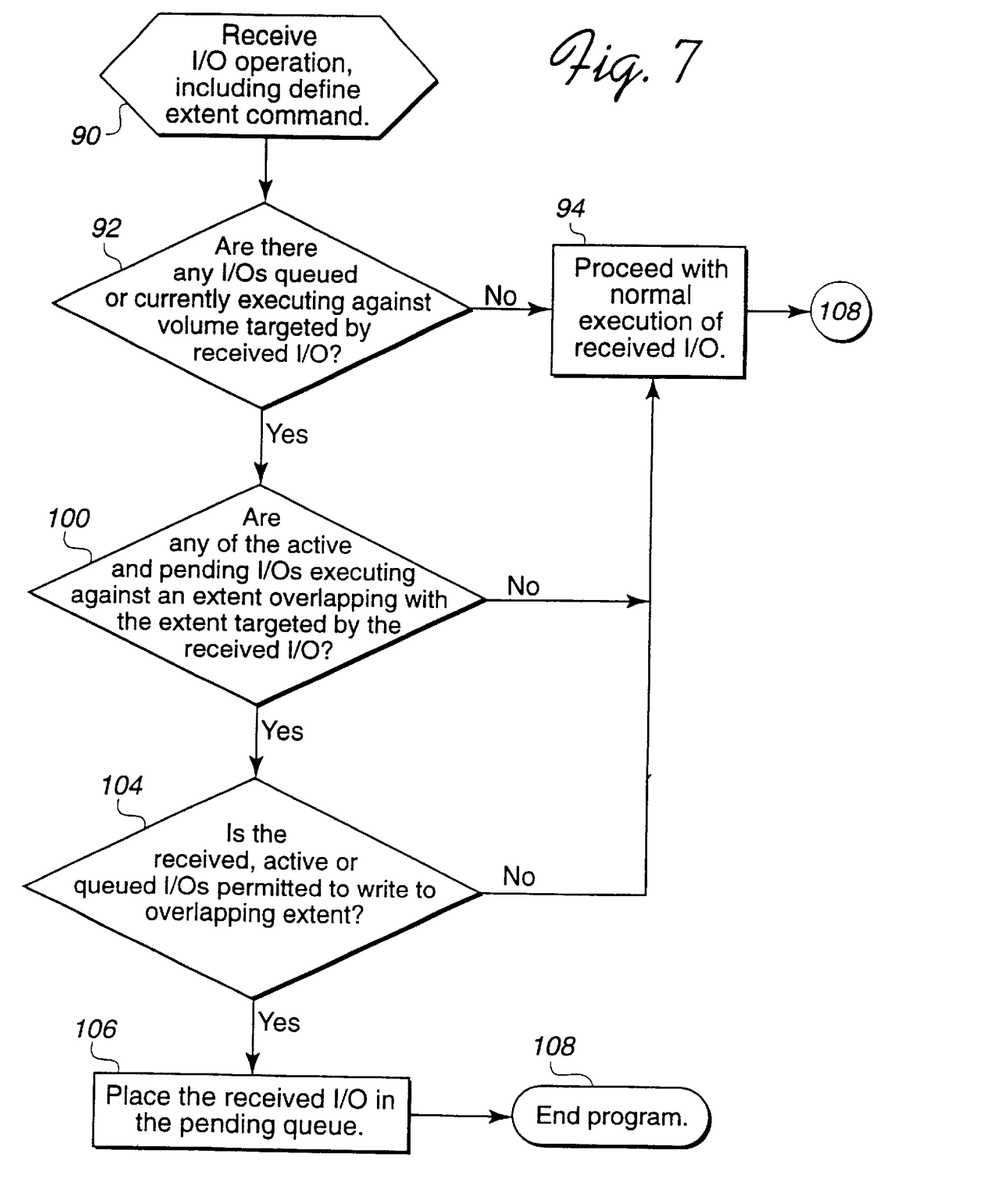
FIG. 7 illustrates logic to handle I/O operations in accordance with preferred embodiments of the present invention.

FIG. 7 illustrates logic implemented in the storage controller 18 to handle I/O operations. The logic of FIG. 7 applies to cases where multiple I/O requests are received for a specific volume from a single host, in the PAV case, or from multiple hosts. Control begins at block 90 which represents the storage controller 18 receiving an I/O operation (I/O) along with a define extent command and locate record command. As discussed, for PAV volumes, if the unit address of the I/O operation is an alias unit address, then the storage controller 18 executes the I/O operation against the base unit address associated with the alias unit address. Control transfers to block 92 which represents the storage controller 18 determining whether there are any active or queued I/O operations executing against the volume which the received I/O operation intends to execute against. As discussed, the define extent command indicates the extents and operations allowed for the I/O operation, or chain of CCW commands. If no, control transfers to block 94 to proceed with normal execution of the received I/O operation against the volume. Otherwise, control transfers to block 100 which represents the storage controller 18 determining whether any of the active or queued I/O operations are executing, or intending to execute, against an extent range of data sets that overlap the extent range the received I/O operation is permitted to operate within.

In preferred embodiments, the storage controller 18 processes the define extent commands for the active and queued I/O operations to determine the extents the 100 operations are permitted to operate against to make the overlap comparison at block 100. The storage controller 18 may proceed sequentially through each active and queued I/O operation to make this determination. If the storage controller 18 determines that there are no overlapping extents and there are no queued operations for the target I/O device 26a, b, c, then control transfers to block 94 which represents the storage controller 18 proceeding to execute the received I/O operation. In such case, the storage controller 18 would be executing the I/O operation in parallel with other active I/O operations. Otherwise, if the extents overlap, control transfers to block 104 which represents the storage controller 18 processing the define extent commands to determine whether either the received I/O operation or any of the active and queued I/O operations permitted to operate against the overlapping extent are also are permitted to write to the overlapping extent. If so, control transfers to block 106 which represents the storage controller 18 placing the received I/O operation in the pending queue. Otherwise, if there are no writes permitted, control transfers to block 94 to execute the received I/O operation. From blocks 94 and 106, control transfers to block 108 to end the program for handling received I/Os.

In preferred embodiments, I/O operations are queued against the target volume (I/O device ). If the storage controller 8 determines the received I/O operation overlaps with an active or queued I/O operation according to the logic of FIG. 7, then the conflicting received I/O operation is queued. When the active I/O operation completes, then the storage controller 8 determines whether any tasks are pending in the queue. If so, the storage controller 8 executes the first pending task in the queue and then determines whether another queued task has a conflict with the just executed task. If there is no conflict, then the storage controller 18 executes that entry in the queue and proceeds to the next entry. If there is a conflict, then the pending task waits for the current task to complete. In preferred embodiments, the storage controller 8 would only have to check for conflicts within a queue which queues request toward a particular track or volume. Alternatively, the storage controller 8 may perform conflict checking to determine conflicts across all queues.

The storage controller 18 executes the logic of FIG. 7 to handle I/O requests directed to either PAV volumes or SAV volumes. If the storage controller 18 receives an I/O request directed toward an alias unit address, then the storage controller 18 would queue the received I/O operation against the base UACB for the alias. As discussed, the storage controller 18 executes an I/O against an alias unit addresses by determining from the alias UACB the base unit address for the alias. Thus, the logic of FIG. 7 may be used to execute parallel I/O operations against SAV volumes and the PAV volumes of the preferred embodiments.

Conclusion

This concludes the description of the preferred embodiments of the invention. The following describes some alternative embodiments for accomplishing the present invention.

Preferred embodiments were described as implemented in a mainframe operating system, such as the IBM S/390 system, and the IBM 3990 Storage Controller where read/write operations utilize commands such as the define extent command, locate record command, and chain of CCW commands. However, those skilled in the art will appreciate that the use of base and alias addressing to direct I/O operations concurrently to the same volume could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The host 16 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 18.

Preferred embodiments were described as using the define extent and locate commands in the IBM system. However, in alternative embodiments any single or multiple data structures may be used to indicate the extent within which an I/O operation may operate and the restrictions on such operations, i.e., no write. Moreover, the restrictions may include more than just no writes and may encompass specific types of writes or certain read operations. In such case, the storage controller 18 would compare permitted ranges and determine if the permission for any active or queued I/O operation conflicts with the permission for the potential I/O operation. In further embodiments, the storage controller may compare not what is permissible, but the actual parameters of the I/O operation, including the commands and extents where the I/O operation will operate to determine if a conflict exists.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively, from the host system directly to the I/O device without the intervention of the channel subsystem and subchannels.

In summary, preferred embodiments in accordance with the present invention provide a system for handling an input/output (I/O) operation. A controller receives an I/O operation against an address for an I/O device. The controller determines whether there is at least one active I/O operation executing against the I/O device. After determining that there is at least one active I/O operation, the controller determines whether the received I/O operation conflicts with active I/O operations executing against the I/O device. The controller then executes the received I/O operation against the I/O device concurrently with the active I/O operations after determining that the received I/O operation does not conflict with active I/O operations.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing input/output (I/O) operations, comprising:
   receiving an I/O operation against an address addressing an I/O device;
   determining whether there is at least one active I/O operation executing against the I/O device;
   determining whether the received I/O operation is capable of conflicting with active I/0 operations after determining that there is at least one active I/O operation executing against the I/O device, wherein I/O operations conflict if their concurrent execution against the I/O device results in data integrity errors; and
   executing the received I/O operation against the I/O device concurrently with the active I/O operations after determining that the received I/O operation does not conflict with active I/O operations.

2. The method of claim 1, wherein the received I/O operation address is an alias address addressing an I/O device addressed by a base address, further comprising the step of determining the base address from the alias address, wherein the base address is utilized to determine active I/O operations and execute the received I/O operation.

3. The method of claim 1, wherein the step of determining whether the received I/O operation conflicts further comprises determining whether the received I/O operation conflicts with a queued I/O operation.

4. The method of claim 1, wherein the I/O device is a volume in a storage system, wherein a data structure is associated with the I/O operations that indicates an extent of data sets within the volume and I/O operation types, wherein the step of determining whether the received I/O operation conflicts with active I/O operations comprises the steps of:
   processing the data structures associated with the active and received I/O operations to determine whether any of the extents of data sets indicated in the data structures overlap; and
   processing the data structures associated with the active I/O operations whose extents of data sets overlap the extent of data sets for the received I/O operation to determine whether the indicated I/O operation types of any of the active I/O operations conflict with the I/O operation type for the received I/O operation, wherein there is no conflict when the I/O operation types for the active and received I/O operations do not conflict.

5. The method of claim 4, wherein the I/O operation types comprise at least one of a write operation and read operation, wherein a conflict is determined if one of the I/O operation types associated with the active and received I/O operations is a write operation.

6. The method of claim 4, wherein the extent information in the data structures indicates a permissible extent in which the I/O operation may execute and the I/O operation types indicate an I/O operation type the I/O operation is permitted to perform.

7. The method of claim 1, further comprising the step of queuing the received I/O operation in a queue after determining that the received I/O operation conflicts with an active I/O operation.

8. The method of claim 7, further comprising the steps of:
   determining whether an active I/O operation has completed;
   accessing an I/O operation pending in the queue;
   determining whether there is at least one active I/O operation executing against the I/O device;
   determining whether the accessed I/O operation conflicts with an active I/O operation after determining that there is at least one active I/O operation executing against the I/O device; and executing the accessed I/O operation against the I/O device concurrently with the active I/O operations after determining that the received I/O operation does not conflict with current I/O operations.

9. A system for processing input/output (I/O) operations, comprising:

a processing unit;

a memory area accessible to the processing unit;

an I/O device accessible to the processing unit; and program logic executed by the processing unit, including:
(i) means for receiving an I/O operation against an address addressing the I/O device;
(ii) means for determining whether there is at least one active I/O operation executing against the I/O device;
(iii) means for determining whether the received I/O operation is capable of conflicting with active I/O operations after determining that there is at least one active I/O operation executing against the I/O device, wherein I/O operations conflict if their concurrent execution against the I/O device results in data integrity errors; and
(iv) means for executing the received I/O operation against the I/O device concurrently with the active I/O operations after determining that the received I/O operation does not conflict with active I/O operations.

10. The system of claim 9, wherein the received I/O operation address is an alias address addressing an I/O device addressed by a base address, wherein the program logic further comprises means for determining the base address from the alias address, wherein the base address is utilized to determine active I/O operations and execute the received I/O operation.

11. The system of claim 9, further comprising means for determining whether the received I/O operation conflicts with a queued I/O operation.

12. The system of claim 9, wherein the I/O device is a volume in a storage system, wherein a data structure is associated with the I/O operations that indicates an extent of data sets within the volume and I/O operation types, wherein the program logic further comprises:

means for processing the data structures associated with the active and received I/O operations to determine whether any of the extents of data sets indicated in the data structures overlap; and means for processing the data structures associated with the active I/O operations whose extents of data sets overlap the extent of data sets for the received I/O operation to determine whether the indicated I/O operation types of any of the active I/O operations conflict with the I/O operation type for the received I/O operation, wherein there is no conflict when the I/O operation types for the active and received I/O operations do not conflict.

13. The system of claim 12, wherein the I/O operation types comprise at least one of a write operation and read operation, wherein a conflict is determined if one of the I/O operation types associated with the active and received I/O operations is a write operation.

14. The system of claim 12, wherein the extent information in the data structures indicates a permissible extent in which the I/O operation may execute and the I/O operation types indicate an I/O operation type the I/O operation is permitted to perform.

15. The system of claim 9, further comprising a memory area accessible to the processing unit, wherein the processing unit queues the I/O operation in the memory area after determining that the received I/O operation conflicts with an active I/O operation.

16. The system of claim 15, wherein the program logic further comprises:

means for determining whether an active I/O operation has completed;

means for accessing an I/O operation pending in the queue;

means for determining whether there is at least one active I/O operation executing against the I/O device;

means for determining whether the accessed I/O operation conflicts with an active I/O operation after determining that there is at least one active I/O operation executing against the I/O device; and means for executing the accessed I/O operation against the I/O device concurrently with the active I/O operations after determining that the received I/O operation does not conflict with current I/O operations.

17. An article of manufacture for use in programming a processing unit to control access to an I/O device, the article of manufacture comprising at least one computer readable storage device including at least one computer program embedded therein that causes the processing unit to perform:

receiving an I/O operation against an address addressing an I/O device;

determining whether there is at least one active I/O operation executing against the I/O device;

determining whether the received I/O operation is capable of conflicting with active I/O operations after determining that there is at least one active I/O operation executing against the I/O device, wherein I/O operations conflict if their concurrent execution against the I/O device results in data integrity errors; and executing the received I/O operation against the I/O device concurrently with the active I/O operations after determining that the received I/O operation does not conflict with active I/O operations.

18. The article of manufacture of claim 17, wherein the received I/O operation address is an alias address addressing an I/O device addressed by a base address, further comprising the step of determining the base address from the alias address, wherein the base address is utilized to determine active I/O operations and execute the received I/O operation.

19. The article of manufacture of claim 17, wherein the step of determining whether the received I/O operation conflicts further comprises determining whether the received I/O operation conflicts with a queued I/O operation.

20. The article of manufacture of claim 17, wherein the I/O device is a volume in a storage system, wherein a data structure is associated with the I/O operations that indicates an extent of data sets within the volume and I/O operation types, wherein the step of determining whether the received I/O operation conflicts with active I/O operations comprises the steps of:

processing the data structures associated with the active and received I/O operations to determine whether any of the extents of data sets indicated in the data structures overlap; and processing the data structures associated with the active I/O operations whose extents of data sets overlap the extent of data sets for the received I/O operation to determine whether the indicated I/O operation types of any of the active I/O operations conflict with the I/O operation type for the received I/O operation, wherein there is no conflict when the I/O operation types for the active and received I/O operations do not conflict.

21. The article of manufacture of claim 20, wherein the I/O operation types comprise at least one of a write operation and read operation, wherein a conflict is determined if one of the I/O operation types associated with the active and received I/O operations is a write operation.

22. The article of manufacture of claim 20, wherein the extent information in the data structures indicates a permissible extent in which the I/O operation may execute and the I/O operation types indicate an I/O operation type the I/O operation is permitted to perform.

23. The article of manufacture of claim 17, further comprising the step of queuing the received I/O operation in a queue after determining that the received I/O operation conflicts with an active I/O operation.

24. The article of manufacture of claim 23, further comprising the steps of:

determining whether an active I/O operation has completed;

accessing an I/O operation pending in the queue;

determining whether there is at least one active I/O operation executing against the I/O device;

determining whether the accessed I/O operation conflicts with an active I/O operation after determining that there is at least one active I/O operation executing against the I/O device; and executing the accessed I/O operation against the I/O device concurrently with the active I/O operations after determining that the received I/O operation does not conflict with current I/O operations.

* * * * *